(12) United States Patent
Shiratori et al.

(10) Patent No.: US 9,601,141 B2
(45) Date of Patent: Mar. 21, 2017

(54) LINEAR RECORDING DEVICE FOR EXECUTING OPTIMUM WRITING UPON RECEIPT OF SERIES OF COMMANDS INCLUDING MIXED READ AND WRITE COMMANDS AND A METHOD FOR EXECUTING THE SAME

(71) Applicant: INTERNATIONAL BUSINESS MACHINES CORPORATION, Armonk, NY (US)

(72) Inventors: Toshiyuki Shiratori, Tokyo (JP); Kohei Taguchi, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/599,690

(22) Filed: Jan. 19, 2015

(65) Prior Publication Data

US 2015/0310882 A1    Oct. 29, 2015

Related U.S. Application Data

(63) Continuation of application No. 12/909,765, filed on Oct. 21, 2010, now Pat. No. 8,966,169.

(30) Foreign Application Priority Data

Dec. 25, 2009    (JP) ................. 2009-294309

(51) Int. Cl.
*G06F 12/08* (2016.01)
*G11B 5/008* (2006.01)
(Continued)

(52) U.S. Cl.
CPC .......... *G11B 5/5508* (2013.01); *G06F 3/0608* (2013.01); *G06F 3/0659* (2013.01);
(Continued)

(58) Field of Classification Search
CPC ................. G06F 3/0682; G06F 3/0686; G06F 2212/213; G11B 5/00813–5/00873
(Continued)

(56) References Cited

U.S. PATENT DOCUMENTS 5,636,355 A    6/1997    Ramakrishnan et al.
5,845,316 A    12/1998    Hillyer et al.
(Continued)

FOREIGN PATENT DOCUMENTS

EP    0708444 A1    4/1996
JP    7084839 A    3/1995
(Continued)

OTHER PUBLICATIONS

Boehler, Paul, "Common SCSI-ATAPI Command Set for Streaming Tape" pp. i-20, Quarter-Inch Cartridge Drive Standards, Inc. QIC 157 Rev. D., Dec. 1995.
(Continued)

*Primary Examiner* — Nathan Sadler
(74) *Attorney, Agent, or Firm* — Griffiths & Seaton PLLC

(57) ABSTRACT

A tape recording device, method, and computer program product are provided for performing operations of position movement, reading, and writing on a tape medium, and receiving a series of commands from an upper-layer device. The tape recording device includes a buffer for temporarily storing data related to the reading and an append write, a tape for recording the data stored in the buffer, a reading and writing head for reading data from the tape into the buffer and writing the data onto the tape, control means for reading data from a designated position of the tape and storing the data in the buffer, and for writing the data stored in the buffer onto the tape from a written data end position in response to
(Continued)

an append write command, and a non-volatile memory for storing data stored in the buffer in response to an append write command.

20 Claims, 11 Drawing Sheets

(51) Int. Cl.
*G11B 5/55* (2006.01)
*G11B 5/584* (2006.01)
*G11B 20/10* (2006.01)
*G06F 3/06* (2006.01)

(52) U.S. Cl.
CPC ........ *G06F 3/0682* (2013.01); *G06F 12/0868* (2013.01); *G11B 5/00817* (2013.01); *G11B 5/584* (2013.01); *G11B 20/10527* (2013.01); *G06F 2212/213* (2013.01); *G11B 2020/10759* (2013.01); *G11B 2220/90* (2013.01)

(58) Field of Classification Search
USPC .................................................. 711/111, 143
See application file for complete search history.

(56) References Cited

U.S. PATENT DOCUMENTS

| 5,892,633 | A | 4/1999 | Ayres et al. |
| 6,763,427 | B1 | 7/2004 | Doi et al. |
| 8,082,388 | B2 | 12/2011 | Bello et al. |
| 8,966,169 | B2 * | 2/2015 | Shiratori et al. ............... 711/111 |
| 2001/0034811 | A1 | 10/2001 | Basham et al. |
| 2003/0142428 | A1 | 7/2003 | Jauette et al. |
| 2004/0133737 | A1 | 7/2004 | Jaquette |
| 2004/0162939 | A1 | 8/2004 | Bartlett |
| 2005/0088771 | A1 | 4/2005 | Jaquette et al. |
| 2007/0053091 | A1 | 3/2007 | Shiratori |
| 2008/0007856 | A1 | 1/2008 | Tango et al. |
| 2008/0168234 | A1 | 7/2008 | Gill et al. |
| 2010/0241770 | A1 | 9/2010 | Tumblin et al. |
| 2011/0261480 | A1 | 10/2011 | Fujihara et al. |

FOREIGN PATENT DOCUMENTS

| JP | 2000048549 A | 2/2000 |
| JP | 2001154809 A | 6/2001 |
| JP | 2001222380 A | 8/2001 |
| JP | 2004118906 A | 4/2004 |
| JP | 2005063444 A | 3/2005 |
| JP | 2008016117 A | 1/2008 |
| JP | 2008165881 A | 7/2008 |

OTHER PUBLICATIONS

Sandsta et al., "Low-Cost Access Time Model for Serpentine Tape Drives" pp. 116-127, IEEE, Mar. 1999, Mss '99.
Hillyer et al., "Random I/O Scheduling in Online Tertiary Storage Systems"ACM. SIGMOD '96, Jun. 1996.
Solworth et al., "Write-Only Disk Caches" ACM. SIGMOD '90, May 1990.
Bell, Tim, "Tape Efficiency" 19 Pages, https://twiki.cern.ch/twiki/pub/FIOgroup/TapeRefCernUsageNov2007/tape_usage_efficiency_v05.pdf, Received Dec. 23, 2009.
Osborne, Tony, "Castor Monitoring" 60 pages, http://castor.web.cern.ch/castor/presentations/2006/Review/Castor_Monitoring.pdf2006.

* cited by examiner

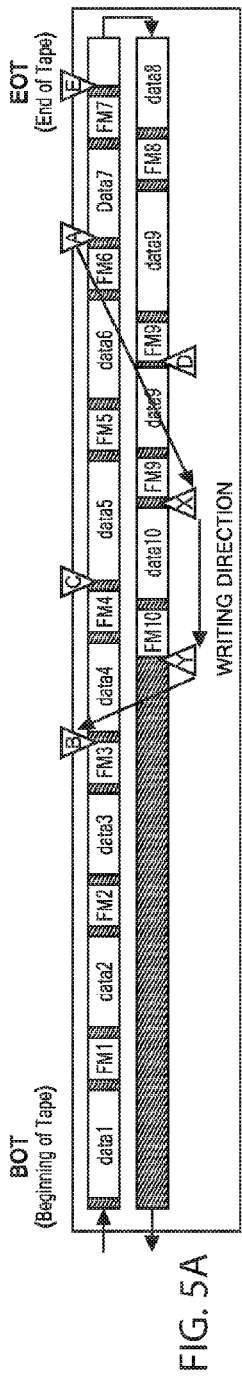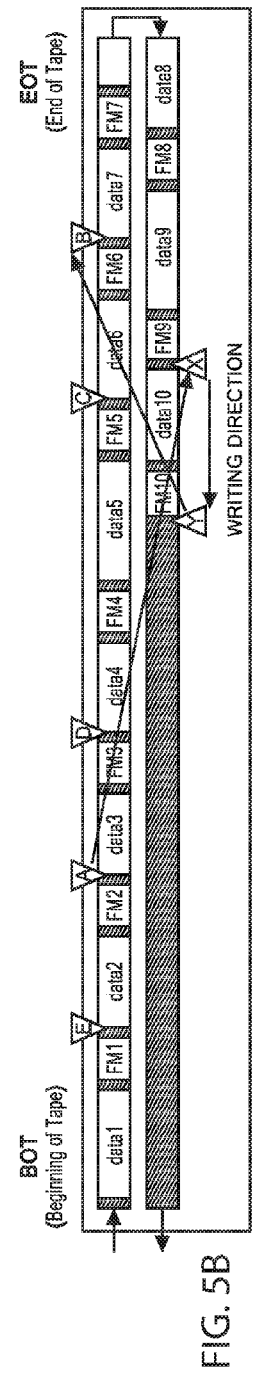

RELATIONSHIP IN MOVEMENT DISTANCE INCREASE OR DECREASE BETWEEN OMISSION OF SYNCHRONIZATION OPERATION AND SUBSEQUENT REWRITING OPERATION

| NUMBER | RELATIONSHIP BETWEEN MOVEMENT DISTANCE (CURRENT POSITION A → TARGET POSITION) AND REWRITING POSITION (X → Y) | MOVING DIRECTION AND WRITING DIRECTION | REDUCTION RESULTING FROM OMISSION OF SYNCHRONIZATION OPERATION | INCREASE RESULTING FROM REWRITING OPERATION DURING SUBSEQUENT MOVING |
|---|---|---|---|---|
| 1-a | MOVING TARGET POSITION B IS LOCATED IN SAME DIRECTION FROM WRITING START POSITION X AND COMPLETION POSITION Y AND COMPLETELY OVERLAPS REWRITING POSITION. | SAME DIRECTION | SAME | NO INCREASE |
| 1-b | MOVING TARGET POSITION B IS LOCATED IN SAME DIRECTION FROM WRITING START POSITION X AND COMPLETION POSITION Y AND COMPLETELY OVERLAPS REWRITING POSITION. | OPPOSITE DIRECTION | REDUCED BY ONE RECIPROCATED DISTANCE BETWEEN POSITION X ↔ Y | INCREASED BY ONE RECIPROCATED DISTANCE BETWEEN POSITION X ↔ Y |
| 2-a | MOVING TARGET POSITION C IS LOCATED IN SAME DIRECTION FROM WRITING START POSITION X AND COMPLETION POSITION Y AND PARTIALLY OVERLAPS REWRITING POSITION. | SAME DIRECTION | REDUCED BY DIFFERENCE BETWEEN POSITION X → Y → C AND POSITION X → C | INCREASED BY DIFFERENCE BETWEEN POSITION X → Y → C AND POSITION X → C |
| 2-b | MOVING TARGET POSITION C IS LOCATED IN SAME DIRECTION FROM WRITING START POSITION X AND COMPLETION POSITION Y AND PARTIALLY OVERLAPS REWRITING POSITION. | OPPOSITE DIRECTION | REDUCED BY ONE RECIPROCATED DISTANCE BETWEEN POSITION Y ↔ X | INCREASED BY ONE RECIPROCATED DISTANCE BETWEEN POSITION Y ↔ X |
| 3-a | MOVING TARGET POSITION D IS LOCATED IN SAME DIRECTION FROM WRITING START POSITION X AND COMPLETION POSITION Y AND DOES NOT OVERLAP REWRITING POSITION. | SAME DIRECTION | REDUCED BY DISTANCE FROM POSITION D → X → Y → D | INCREASED BY DISTANCE FROM POSITION D → X → Y → D |
| 3-b | MOVING TARGET POSITION D IS LOCATED IN SAME DIRECTION FROM WRITING START POSITION X AND COMPLETION POSITION Y AND DOES NOT OVERLAP REWRITING POSITION. | OPPOSITE DIRECTION | REDUCED BY DISTANCE FROM POSITION D → Y → X → Y → D | INCREASED BY DISTANCE FROM POSITION D → Y → X → Y → D |
| 4-a | MOVING TARGET POSITION E IS LOCATED IN OPPOSITE DIRECTION FROM WRITING START POSITION X AND COMPLETION POSITION Y AND DOES NOT OVERLAP REWRITING POSITION. | SAME DIRECTION | REDUCED BY DISTANCE FROM POSITION A → X → Y → A | INCREASED BY DISTANCE FROM POSITION A → X → Y → A |
| 4-b | MOVING TARGET POSITION E IS LOCATED IN OPPOSITE DIRECTION FROM WRITING START POSITION X AND COMPLETION POSITION Y AND DOES NOT OVERLAP REWRITING POSITION. | OPPOSITE DIRECTION | REDUCED BY DISTANCE FROM POSITION A → X → Y → A | INCREASED BY DISTANCE FROM POSITION A → X → Y → A |

FIG. 6

TYPICAL EXAMPLE OF THE INVENTION (CASE "1-a")

CASE "1-a"
- CURRENT POSITION A → MOVING TARGET B
- WRITING (Write) START POSITION X AND COMPLETION POSITION Y EXIST ON WAY IN SUBSEQUENT MOVING FROM A → B
- ○ MOVEMENT DISTANCE
  - CONVENTIONAL CASE: A → X → Y → B
  - THE INVENTION: DATA IN NON-VOLATILE MEMORY IS WRITTEN IN TAPE DURING SUBSEQUENT MOVING A → B.

| COMMAND FROM HOST | OPERATION IN DRIVE OF CONVENTIONAL CASE | OPERATION IN DRIVE OF THE INVENTION |
|---|---|---|
| e.g. (Read data6) ↓ 1. CURRENT POSITION A ↓ 2. position X (goto X) 3. Write data10 ↓ 4. Sync FM10 ↓ 5. position B (go to B) e.g. (Read data4) ↓ | 1. CURRENT POSITION A ↓ 2. MOVE FROM A → X 3. STORE data10 IN BUFFER ↓ 4. DATA10 & FM10 → TAPE → POSITION Y ↓ 5. MOVE FROM Y → B | 1. CURRENT POSITION A ↓ 2. NO MOVING TO X 3. STORE data10 IN BUFFER ↓ 4. DATA10 & FM10 → COPY DATA INTO NON-VOLATILE MEMORY ↓ 5. WRITE data10 & FM10 IN TAPE DURING SUBSEQUENT MOVING FROM A → B |

* sync : SYNCHRONIZATION COMMAND     * position : POSITION COMMAND
* FM0 : DATA DELIMITER

FIG. 7

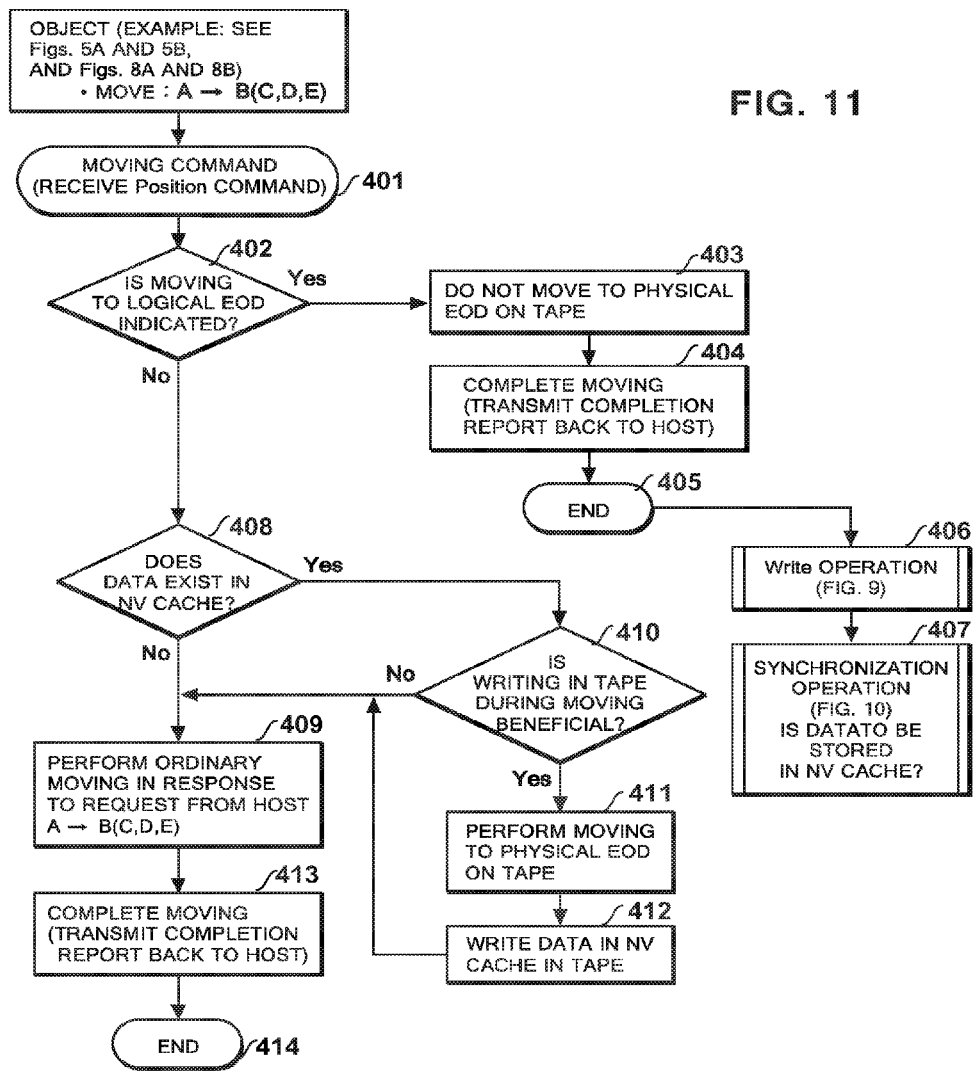

LINEAR RECORDING DEVICE FOR EXECUTING OPTIMUM WRITING UPON RECEIPT OF SERIES OF COMMANDS INCLUDING MIXED READ AND WRITE COMMANDS AND A METHOD FOR EXECUTING THE SAME

CROSS-REFERENCE TO RELATED APPLICATIONS

This application is a Continuation of U.S. patent application Ser. No. 12/909,765, now U.S. Pat. No. 8,966,169, filed on Oct. 21, 2010, which claims priority to Japanese Patent Application No. 2009-294309, filed Dec. 25, 2009, and entitled: "Linear Recording Device for Executing Optimum Writing upon Receipt of Series of Commands Including Mixed Read and Write Commands, Method and Program for Executing the Same."

BACKGROUND

Field of the Invention

The present invention relates to a linear recording device which executes optimum writing upon receipt of a series of commands including mixed Read and Write commands, and to a method and a program for executing the same.

Description of the Related Art

A tape recording device (a tape drive) is a sequential access device. Drive operations include mount/load and unmount/unload of a tape cartridge. Tape operations include operations on a tape medium which are position movement (a Position command), writing (a Write command), reading (a Read command) and synchronization (a Sinc command: Synchronize).

Data to be written on the tape include user data and a file marker (FM) showing a user data delimiter. A Write operation is performed either in a write-once method in which data is written on the tape from a position behind the end of the last data after the tape is moved, or in an overwrite method in which old data is overwritten with new data.

Normally, the tape drive can perform reading and writing operations in a mixed manner, and these operations involve a moving operation and a synchronization operation (flush). The synchronization and moving operations cause the tape to move in a lengthwise direction thereof, thereby lowering the Read and Write performance of the tape drive. Note that the synchronization operation is an operation of ensuring that data temporarily stored in a buffer is written in a tape medium.

Meanwhile, a hierarchical storage management (HSM) system has the mixed Read and Write operations performed on tape drives.

The tape drive is also included in a tape library that is at a lower layer of the HSM system. A single tape drive, however, is not required to perform Read and Write operations in a mixed manner so that the lowering of the overall performance of the entire read and write processing can be avoided.

Instead, the single tape drive performs either the Write operation or the Read operation for each mount of a tape cartridge. Alternatively, multiple tape drives are each used for either of Write and Read operations. These techniques require more tape drives, increase time-consuming (effort-taking) mount operations, and thus lower the processing performance.

SUMMARY OF THE INVENTION

In one embodiment, a tape recording device is provided for performing operations of position movement, reading, and writing on a tape medium back and forth in a longitudinal direction of the tape medium, and receiving a series of commands from an upper-layer device. The series of commands includes mixed read and write commands and giving a plurality of the read commands from a first read command, a second read command, . . . an m-th read command, and an n-th read command, in this order. The tape recording device includes a buffer for temporarily storing therein data related to the reading and an append write, a tape for recording thereon the data stored in the buffer, a reading and writing head for reading data from the tape into the buffer and writing the data from the buffer onto the tape, control means for reading data from a designated position of the tape and storing the data in the buffer in response to a reading command, and for writing the data stored in the buffer onto the tape from a written data end position thereof in response to an append write command, and a non-volatile memory for storing therein data stored in the buffer in response to an append write command. The control means further, upon receipt of the append write command, stores the data stored in the buffer into the non-volatile memory from a written data end position, returns a completion notification of the append write command to the upper-layer device when the data in the buffer is written in the non-volatile memory, and if such a predetermined criterion as to minimize a movement distance by which the tape travels relative to the head is satisfied, moves to a tape writing position where the data held in the non-volatile memory is to be written and additionally writes the data onto the tape from the tape writing position in the course of moving from an end position on the tape of reading data for the m-th read command to a start position on the tape of reading data for the n-th read command after reception of the append write command.

In another embodiment, a method is provided for writing to a tape recording device. The tape recording device receives a series of commands from an upper-layer device and comprises a buffer for temporarily storing data related to reading and an append write, a tape for recording the data stored in the buffer, a reading and writing head for reading data from the tape into the buffer and writing the data from the buffer onto the tape, and control means for reading data from a designated position of the tape and storing the data in the buffer in response to a reading command and writing the data stored in the buffer onto the tape from a written data end position (EOD) in response to an append write command. Upon receipt of the append write command, the data stored is stored in the buffer into a non-volatile memory from a written data end position in memory. A completion notification of the append write command is returned to the upper-layer device when the data in the buffer is written in the non-volatile memory. If such a predetermined criterion as to minimize a movement distance by which the tape travels relative to the head is satisfied, a tape writing position is moved to where the data stored in the non-volatile memory is to be written and additionally writing the data onto the tape from the tape writing position in the course of moving from an end position on the tape of reading data for a m-th Read to a start position on the tape of reading data for an n-th Read after the data is stored in the non-volatile memory.

In a further embodiment, a computer program product is provided for writing to a tape recording device. The tape recording device receives a series of commands from an upper-layer device and comprises a buffer for temporarily storing data related to reading and an append write, a tape for recording the data stored in the buffer, a reading and writing head for reading data from the tape into the buffer and writing the data from the buffer onto the tape, and control means for reading data from a designated position of the tape and storing the data in the buffer in response to a reading command and writing the data stored in the buffer onto the tape from a written data end position (EOD) in response to an append write command. The computer program product comprising a computer-readable storage medium having computer-readable program code portions stored therein and includes a first executable portion, a second executable portion, and a third executable portion. The first executable portion is for, upon receipt of the append write command, storing the data stored in the buffer into a non-volatile memory from a written data end position in memory. The second executable portion is for returning a completion notification of the append write command to the upper-layer device when the data in the buffer is written in the non-volatile memory. The third executable portion is for, if such a predetermined criterion as to minimize a movement distance by which the tape travels relative to the head is satisfied, moving to a tape writing position where the data stored in the non-volatile memory is to be written and additionally writing the data onto the tape from the tape writing position in the course of moving from an end position on the tape of reading data for a m-th Read to a start position on the tape of reading data for an n-th Read after the data is stored in the non-volatile memory.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which:

FIGS. 5A and 5B show reduction in movement distance resulting from omission of writing and synchronization operations in the example;

FIG. 6 shows a table summarizing a relationship in movement distance increase or decrease between omission of synchronization operation and subsequent rewriting operation (the cases 1-a to 4-b in FIGS. 5A and 5B);

FIG. 7 shows that a writing position exists on the way in moving in the case 1-a;

FIG. 11 shows an operation flow of moving (Position) between two points when a writing position exists therebetween.

DETAILED DESCRIPTION OF THE DRAWINGS

Figure 1:
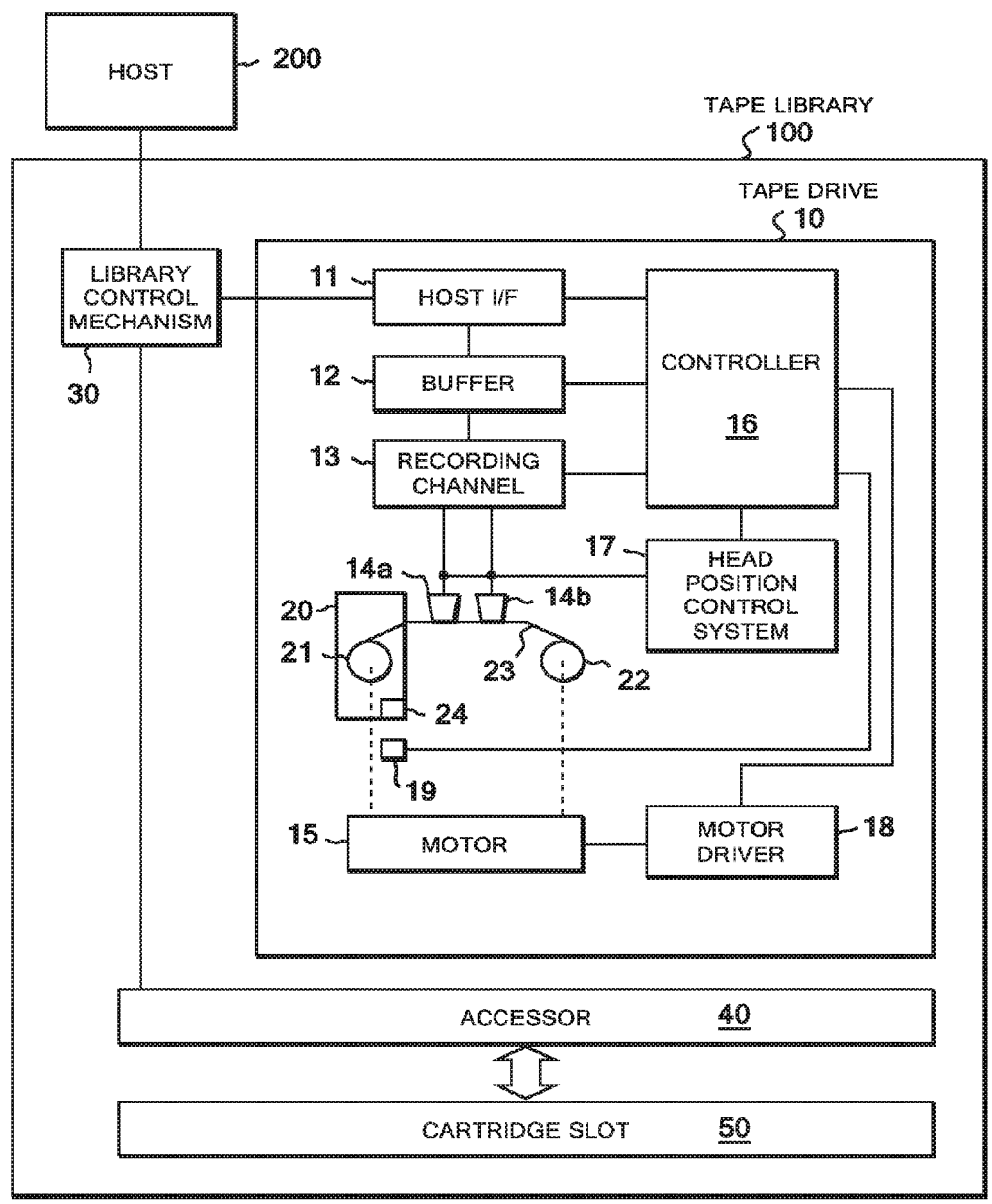
FIG. 1 is a diagram showing a configuration example of a tape library 100 including a tape drive to which this embodiment is applied.

According to one aspect of the present invention, in order to reduce tape drives to be used and the mount operations, it is effective to enable a single set of a tape drive and a tape cartridge to perform mixed Read and Write operations without lowering the performance.

Hence, an object of the present invention is to provide a (linear recording) tape storage device that executes an optimum writing method in mixed Read and Write operations performed on a single tape drive and a single tape cartridge. Another object of the present invention is to provide the optimum writing method and a program therefor.

The present invention made to achieve the above object is a tape recording device that performs operations of position movement, reading, and writing on a tape medium back and forth in a longitudinal direction thereof, and that receives a series of commands from an upper-layer device, the series of commands including mixed commands (Read and Write) of reading and append write and giving a plurality of the Reads from a first Read, a second Read, . . . an m-th Read, an n-th Read, . . . (1, 2, . . . m, n=m+1, . . . ) in this order. The device includes: a buffer for temporarily storing therein data related to the reading and an append write; a tape for recording thereon the data stored in the buffer; a reading and writing head that reads data from the tape into the buffer and writes the data from the buffer onto the tape; control means for reading data from a designated position of the tape and storing the data in the buffer in response to a reading command, and for writing the data stored in the buffer, onto the tape from a written data end position (EOD) thereof in response to an append write command; and a non-volatile memory for storing therein data stored in the buffer, in response to an append write command. The device is characterized in that the control means further (a) upon receipt of the append write command, stores the data stored in the buffer into the non-volatile memory from a written data end position (EOD in memory), (b) returns a completion notification of the append write command to the upper-layer device when the data in the buffer is written in the non-volatile memory, and (c) if such a predetermined criterion as to minimize a movement distance by which the tape travels relative to the head is satisfied, moves to a tape writing position (EOD) where the data held in the non-volatile memory is to be written and additionally writes the data onto the tape from the tape writing position, in the course of moving from an end position on the tape of reading data for the m-th Read to a start position on the tape of reading data for the n-th Read after reception of the append write command.

The device is characterized in that the criterion is satisfied if the data end position (EOD) of the tape at which the data is to be written exists within the movement distance (between the end position and the start position).

The device is characterized in that the criterion is satisfied if a direction of the moving (from the end position to the start position) is the same as a direction of writing from the tape writing position (EOD) and if a tape writing position after new writing in the tape (EOD after writing) exists within the movement distance.

The device is characterized in that when receiving a command for rewinding (Rewind) or unloading (Unload) a cartridge, the control means in operation of (c) writes all the data stored in the non-volatile memory onto the tape from the written data end position (EOD).

The device is characterized in that when the non-volatile memory is filled up, the control means in operation of (c) writes all the data stored in the non-volatile memory onto the tape from the written data end position (EOD).

The device is characterized in that when having returned a completion notification of the append write command in (b), the control means does not return the completion notification of the append write command in (c).

The device is characterized in that the control means executes the writing from the non-volatile memory onto the physical EOD of the tape via the buffer.

The device is characterized in that as a premise of the reading and writing commands, the control means receives a moving command (a Position command) from the higher-layer device so that the moving to the designated position of the tape is performed, and the head is positioned at the EOD on the tape or the EOD in memory in response to the moving command.

The device is characterized in that the append write command includes a synchronization operation, and the control means writes the data stored in the buffer onto the tape or the non-volatile memory.

The device is characterized in that the non-volatile memory is a flash memory having a predetermined capacity.

The device is characterized in that the flash memory has a capacity of 100 Mbytes or more.

The device is characterized in that the non-volatile memory is a preparatory track area in the same tape of a single cartridge.

Further, the present invention made to achieve the above object is an append write method performed on a tape recording device in a case where the tape recording device has a tape cartridge with a tape medium loaded thereon and receives a series of commands from an upper-layer device, the tape recording device including: a buffer for temporarily storing therein data related to the reading and the append write; a tape for recording thereon the data stored in the buffer; a reading and writing head which reads data from the tape into the buffer and writes the data from the buffer onto the tape; and control means for reading data from a designated position of the tape and storing the data in the buffer in response to a reading command, and for writing the data stored in the buffer, onto the tape from a written data end position (EOD) thereof in response to an append write command, the tape recording device performing operations of position movement, reading, and writing on a tape medium back and forth in a longitudinal direction of the tape medium, the series of commands including mixed commands (Read and Write) (each command to be executed after moving to a position of the tape designated by a moving command (Position)) of reading and append write and giving a plurality of the Reads from a first Read, a second Read, . . . an m-th Read, an n-th Read, . . . (1, 2, . . . m, n=m+1, . . . ) in this order, the tape recording device or the cartridge provided with a non-volatile memory to store therein data stored in the buffer in response to an append write command. The method is characterized by including the steps of: (a) upon receipt of the append write command, storing the data stored in the buffer into the non-volatile memory from a written data end position (EOD in memory); (b) returning a completion notification of the append write command to the upper-layer device when the data in the buffer is written in the non-volatile memory; and (c) if such a predetermined criterion as to minimize a movement distance by which the tape travels relative to the head is satisfied, moving to a tape writing position (EOD) where the data stored in the non-volatile memory is to be written and additionally writing the data onto the tape from the tape writing position, in the course of moving from an end position on the tape of reading data for the m-th Read to a start position on the tape of reading data for the n-th Read after the data is stored in the non-volatile memory.

Still further, the present invention made to achieve the above object is a program for append write performed on a tape recording device in a case where the tape recording device has a tape cartridge with a tape medium loaded thereon and receives a series of commands from an upper-layer device, the tape recording device including: a buffer for temporarily storing therein data related to the reading and the append write; a tape for recording thereon the data stored in the buffer; a reading and writing head which reads data from the tape into the buffer and writes the data from the buffer onto the tape; and control means for reading data from a designated position of the tape and storing the data in the buffer in response to a reading command, and for writing the data stored in the buffer, onto the tape from the tape in response to an append write command, operations of position movement, reading, and writing on a tape medium are performed back and forth in a longitudinal direction of the tape medium, the series of commands including mixed commands (Read and Write) (each command to be executed after moving to a position of the tape designated by a moving command (Position)) of reading and append write and giving a plurality of the Reads from a first Read, a second Read, . . . an m-th Read, an n-th Read, . . . (1, 2, . . . m, n=m+1, . . . ) in this order, the tape recording device or the cartridge provided with a non-volatile memory for storing therein data stored in the buffer in response to an append write command. The program is characterized by causing a computer to execute the steps of: (a) upon receipt of the append write command, storing the data stored in the buffer into the non-volatile memory from a written data end position (EOD in memory); (b) returning a completion notification of the append write command to the upper-layer device when the data in the buffer is written in the non-volatile memory; and (c) if such a predetermined criterion as to minimize a movement distance by which the tape travels relative to the head is satisfied, moving to a tape writing position (EOD) where the data stored in the non-volatile memory is to be written and additionally writing the data onto the tape, in the course of moving from an end position on the tape of reading data for the m-th Read to a start position on the tape of reading data for the n-th Read after the data is stored in the non-volatile memory.

According to the present invention as described above, the tape storage device of the present invention is capable of achieving enhancement (speed-up) of the overall performance of the mixed operations by omitting a synchronizing operation in writing, when the tape storage device receives a series of commands including mixed reading and append write commands from an upper-layer device.

Hereinbelow, a description is given of an embodiment (hereinafter, referred to as an example) of a method of additionally writing data by a linear recording tape drive on which a single tape cartridge is loaded and which has received a series of commands including mixed read and append write commands from a host. The example is considered exemplary only and does not limit the write-once tape storage device, the method, and the program of the invention.

It is conceived that a total tape movement distance and duration with respect to a reading or a writing head should be reduced in mixed append write and reading operations of a tape drive with a single tape cartridge loaded thereon.

Accordingly, a summary of the invention is given in which following matters (constitutions) to specify the invention are performed. When there arises a need for a synchronization operation (writing in the tape) of data written in a buffer, the data to be flushed is written in a temporary non-volatile storage area. As the temporary storage area, used is an area where no movement in the tape is required or where the total tape movement distance and duration can be made less than those for recording in an originally intended area. In addition, writing time should be equal to or shorter than ordinary writing time. The temporarily stored data is rewritten later in the originally intended area. Normally, the data is left in the buffer, and rereading from the temporary storage area is not required in the rewriting. The rewriting operation is performed as a moving operation in a subsequent process. If data in the buffer is lost due to accidental powering-off, the data is read from the non-volatile temporary storage area as processing of recovery from an error, and then is written in the originally intended recording area.

First, a description is given of a tape drive and a tape library including the tape drive, to which this embodiment is applied.

FIG. 1 is a diagram showing a configuration example of a tape library 100 including the tape drive, to which this embodiment is applied. As illustrated in FIG. 1, the tape library 100 includes a tape drive 10, a library control mechanism 30, an accessor 40, and a cartridge slot 50. The tape drive 10 includes a host interface (hereinafter, referred to as "host I/F") 11, a buffer 12, a channel 13, a writing head 14a, a reading head 14b, and a motor 15, and also includes a controller 16, a head position control system 17, and a motor driver 18. Furthermore, a tape cartridge (hereinafter, simply referred to as a "cartridge") 20 is also illustrated, since the cartridge 20 is loadable on the tape drive 10 by being inserted into the tape drive 10. The cartridge 20 includes a tape 23 wound around reels 21, 22. With the rotation of the reels 21, 22, the tape 23 is moved in a longitudinal direction thereof, from the reel 21 to the reel 22, or from the reel 22 to the reel 21. A magnetic tape is exemplified as the tape 23, but a tape medium other than the magnetic tape may be used.

The cartridge 20 also includes a cartridge memory 24. The cartridge memory 24 records information of, for example, how data is written in the tape 23. When indexes of the data written in the tape 23 and a use status of the tape 23 are checked in a non-contact manner by using, for example, an RF interface, high-speed access to the data is made possible. Note that an interface, like the RF interface, for accessing the cartridge memory 24 is shown as a cartridge memory interface (hereinafter, referred to as a "CMI/F") 19 in FIG. 1.

Meanwhile, the host I/F 11 communicates with a host 200. For example, from the host 200, the host I/F 11 receives a command for writing data in the tape 23, a command for moving the tape 23 to a target position, and a command for reading data from the tape 23. Incidentally, SCSI is exemplified as a communication standard used for the host I/F 11. In SCSI, a first command corresponds to a Write command; a second command, a Locate command or a Space command, for a tape moving operation; a third command, a Read command. The host I/F 11 responds to the host 200, whether or not processing in response to a corresponding one of the commands succeeds or fails.

Data buffered in the buffer 12 is written in the tape 23 by a synchronization operation (Flush). The synchronization after Write is explicitly specified by a command (such as a Write Filemark command), or implicitly specified (by a Locate, Space, Rewind or Unload command for moving the position). Moreover, depending on an option of the Write command itself, the Write command itself might not be completed until the synchronization is completed.

The buffer 12 is a memory in which data to be written into the tape 23 and data read from the tape 23 is accumulated. For example, the buffer 12 is configured of a DRAM (Dynamic Random Access Memory). Instead, the buffer 12 is formed of multiple buffer segments, and each buffer segment stores a dataset that is a unit of reading from and writing in the tape 23.

The channel 13 is a communication channel used for transmitting data to be written in the tape 23 to the writing head 14a and for receiving, from the reading head 14b, data which is read from the tape 23.

When the tape 23 moves in the longitudinal direction, the writing head 14a writes information in the tape 23, while the reading head 14b reads information from the tape 23.

The motor 15 rotates the reels 21, 22. Although the motor 15 is shown by a single rectangle in FIG. 1, it is preferable to provide two motors 15 for the respective reels 21, 22.

The controller 16 controls the tape drive 10 on the whole. For example, the controller 16 controls reading or writing data to or from the tape 23 in accordance with a command received by the host I/F 11. The controller also controls the head position control system 17 and the motor driver 18. The head position control system 17 is a system in which the writing head 14a and the reading head 14b are controlled to search for a desired wrap. The wrap is a group of multiple tracks of the tape 23. When there arises a need for moving to a different wrap, electrical switching of the writing head 14a or the reading head 14b is also required. The head position control system 17 controls such switching.

The motor driver 18 drives the motor 15. When the two motors 15 are provided as described above, two motor drivers 18 should be provided.

Meanwhile, the library control mechanism 30 is a mechanism that controls the accessor 40 and the tape drive 10 in response to an instruction from the host 200. Specifically, the library control mechanism 30 instructs the accessor 40 to load the cartridge 20 on the tape drive 10 so that data designated by the host 200 can be read or written, and instructs the tape drive 10 to read the data designated by the host 200 from or to write the data onto the cartridge 20 loaded by the accessor 40.

The accessor 40 takes the cartridge 20 out of the cartridge slot 50 to load the cartridge 20 on the tape drive 10 in accordance with the control of the library control mechanism 30.

The cartridge slot 50 is a space for storing a new cartridge 20 in which no data is written. Here, the cartridge slot 50 is shown by a single rectangle; however, actually, there are provided multiple slots for storing multiple cartridges, respectively.

Note that only one tape drive 10 is shown in FIG. 1, but multiple tape drives 10 may be provided. In this case, the library control mechanism 30 notifies the accessor 40 of identity information of one of the tape drives 10 to which a read or write command is to be transmitted, and thereby instructs the accessor 40 to load a cartridge 20 on the corresponding tape drive 10.

Figure 2:
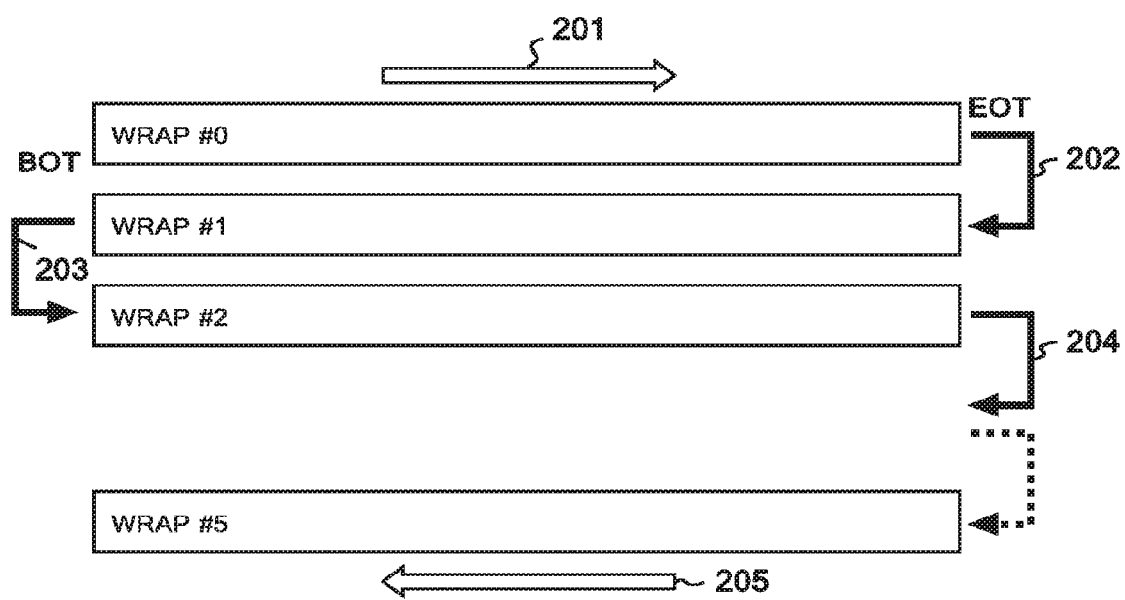
FIG. 2 shows ordinary operations of moving, reading, and writing performed on a tape 23 of the tape drive.

FIG. 2 shows operations of ordinary position movement of data (Position command), reading (Read command), and append write (Write command) that are performed on the tape 23 of a tape drive. The tape drive is a linear recording enterprise tape system (TSxx family of IBM) or one in compliance with Liner Tape-Open (LTO). Firstly, data reading and writing are performed on a wrap #0 in the right direction as shown by an arrow 201, and then the travelling direction of the tape 23 is reversed as shown by an arrow 202. Subsequently, data reading and writing are performed on a wrap #1 in the left direction, and then the travelling direction is reversed as shown by an arrow 203. Furthermore, data reading and writing are performed on a wrap #2 in the right direction, and then the travelling direction is reversed as shown by an arrow 204. In the last step, data reading and writing are performed on a wrap #55 in the left direction as shown by an arrow 205.

As described above, in the linear recording tape drive, the data reading and writing are performed on data storage areas called wraps defined in the tape 23, while the tape 23 is repeatedly moved between the leading edge of the tape 23 (BOT: Beginning of Tape) and the trailing edge thereof (EOT: End of Tape). Each of the wraps is a group of multiple tracks arranged side by side in parallel and spaced away from each other in a width direction of a tape. Each of the writing head 14a and the reading head 14b may include multiple channels (8 or 16 reading/writing devices). Such the writing head 14a and the reading head 14b make it possible to perform operations of moving, reading, and writing on multiple tracks in parallel in the same wrap. In a case of serial reading/writing, wraps of the tape 23 are moved back and forth. Note that the leading edge of the tape 23 is an example of a first end portion and the trailing edge thereof is an example of a second end portion.

Meanwhile, through a HSM system, the tape library 100 located in the lowest layer receives a series of commands for mixed reading/writing operations from the host 200. The following provides an example of enhancing the performance in operation processing of the entire series of commands when a single tape drive receives such a series of commands including the mixed commands. This embodiment achieves "reduction of the total tape movement distance and duration when a tape drive performs mixed operations of append write and reading on a single tape cartridge loaded on the tape drive."

Before a description of the example, a description is given of how much a synchronization operation increases a movement distance in the mixed Read/Write operations. Then, an example is provided in which enhancement of the overall performance is exerted by substantially omitting the movement distance involved with the synchronization operation. Firstly, as a basis of the description of the example, an example should be understood in which conventional mixed Read/Write operations involve an unnecessary movement distance.

Figure 3:
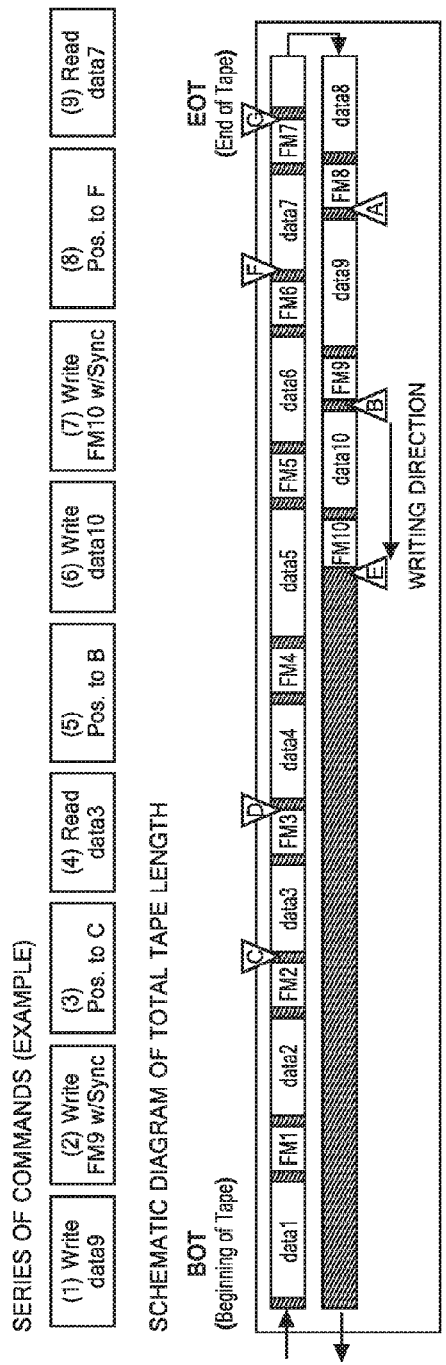
FIG. 3 shows an example of conventional mixed Read and Write operations.

FIG. 3 shows an example of conventional mixed Read/Write operations.

A description is given of an example in which a series of commands including mixed Read/Write is received when a tape is travelled linearly relative to tracks such as from right to left or left to right.

As shown in a series of commands including commands (1) to (9), moving is performed after Write (append write) to perform Read, and further, Write is performed.

Specifically, the operations are performed in the following order: (1) Write data9→(2) Write FM9 w/Sync (Flush is performed simultaneously with writing FileMarker9→(3) Position to C (a command for moving to a position C)→(4) Read data3→(5) Position to B→(6) Write data10→(7) Write FM10 w/Sync→(8) Position to F→(9) Read data7.

Operations of the tape drive are performed as follows. User data are represented by data1 to data10 and FileMarkers (FM) as the delimiter of data are represented by FM1 to FM10.

At a position A, data9 is buffered in a buffer ((1)). After data9 is written in a track from the buffer as a synchronization operation, FM9 is written ((2)). The writing data9 and FM9 involves movement from the position A to a position B. Moving is performed from the position B to a position C ((3)). Data3 is read. The reading data3 involves movement from the position C to a position D ((4)). Moving is performed from the position D to the position B ((5)). Data10 is buffered in the buffer ((6)). After data10 is written as a synchronization operation, FM10 is written ((7)). The writing data10 and FM10 involves movement from the position B to a position E. Moving is performed from the position E to a position F ((8)). Data7 is read. The reading Data7 involves movement from the position F to a position G ((9)).

As shown in FIG. 3 (a lower part of FIG. 3) schematically showing the total tape length, a series of operations involves a movement distance of the tape from the position A→B→C→D→E→F→G. A synchronization operation (for example, Flush by a Sync command) and a moving operation (the Position command) always occur between a writing operation and a reading operation.

The mixed operations involve a long tape movement distance. Specifically, the mixed operations in this case result in an increase by an overlapping section (B→E) resulting from the synchronization operation and subsequent moving to the destination position F as compared to a case in which synchronization operations are omitted. In other words, the conventional operations have a problem that the moving operation requires a duration increased by this increase amount. Thus, a study is made on whether the synchronization operation and the subsequent overlapping section can be omitted.

Figure 4:
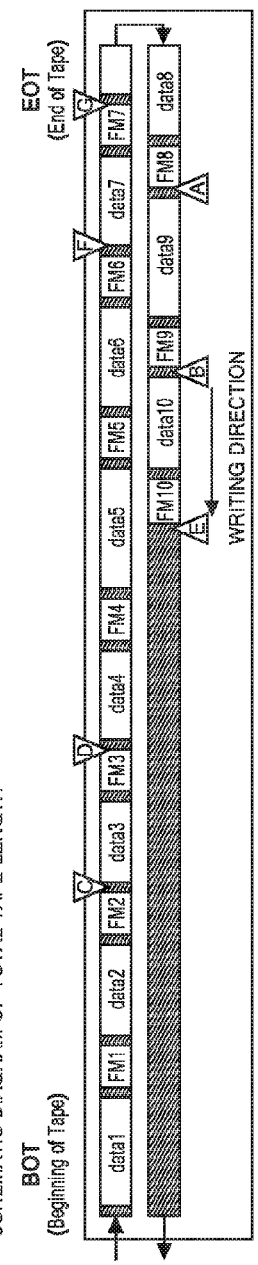
FIG. 4 shows that omission of a synchronization operation can result in reduction in tape movement distance.

FIG. 4 shows that omission of a synchronization operation can lead to reduction in a tape movement distance. When writing data in a tape medium in response to a synchronization command in the same series of commands (commands (1) to (9)) is omitted from the conventional operations (FIG. 3), the movement distance can be reduced. The following show operations of the tape drive in accordance with the same series of commands as in the previous page.

At a position A, data9 is buffered in a buffer ((1)). After data9 is written in a track from the buffer as a synchronization operation, FM9 is written ((2)). The writing data9 and FM9 involves movement from the position A to a position B. Moving is performed from the position B to a position C ((3)). Data3 is read. The reading data3 involves movement from the position C to a position D ((4)). Moving from the position D to the position B ((5)) is omitted. Data10 is buffered in the buffer ((6)). A synchronization operation on data10 and FM10 ((7)) is omitted, and thus data10 is still buffered in the buffer ((6)). Moving is performed from the position D to a position F ((8)). Data7 is read ((9)). The reading data7 involves movement from the position F to a position G.

The operations involve a movement distance from the position A→B→C→D→F→G. The aforementioned conventional example including synchronization operations has three moving operations for moving from the position D→B→E→F, while the aforementioned example from which synchronization operations are omitted has only one moving operation for moving from the position D→F, thereby reducing the movement distance. Specifically, the movement distance is reduced in the following three operations as compared to the case in FIG. 3: moving operation from the position D to B in accordance with the fifth command; a synchronized writing operation of data10 and FM10 involving moving from the position B to E, in accordance with the seventh command; and a moving operation from the position E to F in accordance with the eighth command.

However, it is necessary that, when completion of processing in response to a synchronization command is reported, data is properly written in the media and future access is guaranteed. The invention guarantees that the synchronization operation is substantially ensured for the host. At the same time, the following example discloses a write-once method in which increase of a movement distance of a series of commands including mixed Read/Write is checked by placing Write between Reads.

The following configuration is conceived in the embodiment of the invention so that a synchronization operation for data stored in the buffer can be ensured for the host.

First, a temporary non-volatile storage area is newly provided to a tape cartridge or a tape drive. By providing the non-volatile storage area, the tape cartridge or a tape drive is given an access characteristic to reduce the synchronization operation. Examples of the non-volatile memory include a non-volatile memory such as a flash memory attached to the cartridge or the drive, a special storage area in a tape medium, and the like.

Second, in the tape drive, the temporary non-volatile storage area is used to delay an append write operation starting from an originally intended writing position (physical end of data (EOD)) on the tape. In other words, an operation of rewriting data at the originally intended position on the tape is performed separately. (1) The non-volatile storage area is used to ensure that data can be always read from the tape cartridge (or the tape drive) after reporting the completion of processing in response to a synchronization request from the host. (2) The non-volatile storage area is hidden from the host. Specifically, when a reading operation occurs after a writing operation, data is read from the non-volatile storage area as if the data were written at the originally intended position.

When the non-volatile storage area is newly provided, the tape drive receives a series of commands including mixed Read and Write that is transmitted from the host. Generally, Read is often performed after a reading position is specified. Similarly, Write for append write is performed after a writing position is designated as the EOD. The reading position and the writing position, however, often are not related to each other. If a Write operation for append write, that is, a writing operation (substantial synchronization operation) at a target position (physical EOD) of the tape can be executed in the course of moving between Read operations, an unnecessary tape movement distance can be checked. If a data writing position (physical EOD) of the tape for writing data stored in the non-volatile storage area exists between any two of multiple movement positions for subsequent Read operations, the writing in the tape can be performed during the moving. This can enhance the performance of the series of commands as a whole.

First, in the example, in accordance with a synchronization operation subsequent to an append write command (Write), data stored in the buffer is stored in a non-volatile storage area.

Second, an operation is required in which the data temporarily stored in the non-volatile storage area is written at an originally intended position of a tape (end of data (EOD)).

A movement distance in the rewriting operation has a converse relation with a movement distance in the writing and synchronization operations. This means that a distance reduced by the omission of the synchronization operation is equal to a movement distance increased by the rewriting operation. Data is rewritten in a case where the movement distance or duration can be made less than those in the conventional operations. For example, if a position (EOD) to be rewritten (to be additionally written) is to be passed through during moving operations for multiple Reads, data can be rewritten without moving exclusively for the rewritten operation.

In order to ensure data storing for the synchronization operation of the invention, it is necessary to prevent a state in which the temporary storage area has no free space. When a synchronization command is received, a free space (unused ratio) in the non-volatile storage area might be reduced, depending on a movement distance for rewriting and temporarily stored data volume. When the non-volatile storage area is completely full finally, data in the non-volatile storage area is unconditionally rewritten, being started from the EOD of the tape. After the rewriting operation, ordinary writing operations are subsequently performed on the tape.

In addition, when the Rewind command or the Unload command for the cartridge is received, the rewriting operation is performed unconditionally, because Rewind and Unload mean that the tape cartridge is used up.

FIGS. 5A and 5B show a movement distance at the time of an additional rewriting operation in which a substantial synchronization operation is ensured by use of the non-volatile storage area. FIGS. 5A and 5B show increase and decrease of the movement distance caused by omission of the synchronization operation and the rewriting operation in the example.

A distance in the lengthwise direction of the tape is considered. Rewriting is performed during moving from a current position A to a moving target position B (C, D, or E). A relationship among a rewriting start position X, a completion position Y, and the moving target position B (C, D, or E) with respect to the current position A is classified.

The moving target position B is located in the same direction as the writing start position X and the completion position Y, and is farther from the current position A than the rewriting start position X and the completion position Y are.

The moving target position C is located in the same direction as the rewriting start position X and the completion position Y, and located between the rewriting start position X and the completion position Y.

The moving target position D is located in the same direction as the rewriting start position X and the completion position Y, and is closer than the rewriting start position X and the completion position Y are.

The moving target position E is located in an opposite direction from the rewriting start position X and the completion position Y.

In addition, the movement distance is influenced by different writing directions with respect to a moving direction from the position A→B (C, D or E). There are two writing directions: the same writing direction (FIG. 5A which is an upper figure) as the moving direction; and an opposite writing direction (5B which is a lower figure) from the moving direction.

The following show relationships, in the above directions, between a moving distance from the position A to B (C, D, or E) as a result of the moving operation and a moving distance from the position A→X→Y to B (C, D, or E)) as a result of addition of the rewriting operation.

In the case of the same direction, the movement distance as a result of the rewriting is not increased (1-a). In the case of the opposite direction, since the moving from the position A→B is the same as the moving from the position A→X→B, the movement distance is increased by a distance of a back and forth movement between the position X⇌Y (1-b).

In the case of the same direction, the distance is increased by a difference between movement from the position X→Y to C and movement from the position X to C (2-a). In the case of the opposite direction, since the moving from the position A→C is the same as the moving from the position A→Y→C, the movement distance is increased by a distance of one back and forth movement between the position Y⇌X (2-b).

In the case of the same direction, since the moving from the position A→X is the same as the moving from the position A→D→X, the distance is increased by a distance from the position D→X→Y→D (3-a). In the case of the opposite direction, since the moving from the position A→X is the same as the moving from the position A→D→Y→X, the movement distance is increased by a distance from the position D→Y→X→Y→D (3-b).

In each of the directions, the distance is increased by a distance from the position A→X→Y→A (4-a, 4-b).

By omitting the writing and synchronization operations, the movement distance can be made equal or reduced regardless of the position of the movement target after rewriting. When the movement distance can be reduced in the rewriting operation, the movement distance has the converse relation with movement distance involved with the synchronization operation.

FIG. 6 shows a table summarizing a relationship in movement distance increase or decrease between omission of synchronization operation and subsequent rewriting operation (the cases 1-a to 4-b in FIGS. 5A and 5B).

It is found that the movement distance reduced due to the omission of the synchronization operation on the tape medium has the converse relation with the movement distance involved with the rewriting operation as described with reference to FIGS. 5A and 5B.

When the ratio of the omission of the synchronization operation to occurrence of the rewriting operation is 1:1, no change occurs in the total movement distance. In the example of the invention, any data stored in the buffer is stored in a non-volatile storage area (non-volatile memory) in the synchronization operation. By storing data in the non-volatile memory, a rewriting operation involving tape movement can be omitted. Then, if the movement for the rewriting operation can be omitted, the total movement distance can be reduced. The case 1-a is a case where the movement distance for the rewriting operation can be fully omitted. In the case 1-a, the rewriting position (physical EOD) on the tape is located within the movement distance between two Reads (moving from the data end position for first Read for reading the tape to the data beginning position for second Read for reading the tape). In the case 1-a, the data stored in the non-volatile memory by the synchronization operation is rewritten in the tape in the course of the subsequent moving.

If multiple synchronization operations are omitted and if a rewriting operation for data stored in the non-volatile memory can be executed in the course of moving for subsequent Read operations, the total movement distance of the series of commands including mixed Read/Write commands is always reduced.

In the example of the invention, rewriting processing in the moving operation is determined as follows.

Moving pattern: Case 1-a: When the moving pattern is the case 1-a, there is no increase in movement distance for the rewriting operation. That is, the increase in movement distance is zero. Thus, before the start of the moving operation, the rewriting operation is determined to be always performed in movement for the subsequent Read operation. By referring to FIGS. 5A and 5B, this is the case where the tape writing position (X→Y) is located between two tape positions (A→B).

Moving pattern: Cases 1-b, 2-a, and 2-b: The rewriting operation results in an increase in a movement distance. The increase ratio depends on an originally intended movement distance, the position A→B(C, D or E), the rewriting start position X, and the completion position Y corresponding to the volume of data to be rewritten (X⇌Y).

Whether or not to perform the rewriting processing is determined based on the relationship to be described later between the volume of temporarily stored data and the movement distance as a result of rewriting. The rewriting (X→Y) of the data stored in the non-volatile memory can be performed without an increase halfway until the writing in the distance (X→Y). When the distance (X→Y), however, does not completely overlap the movement distance between two points (A→C, D and E), the rewriting operation involves an increase in the distance. If the increase is small, rewriting of most part of data can be performed within the movement distance. However, since there occurs an increase due to moving for some part of tape writing, a benefit of writing between Reads is not obtained so much in this case.

Moving pattern: Cases 3-a, 3-b, 4-a, and 4-b: Since the moving operation for the rewriting operation largely increases compared to the originally intended movement distance, the rewriting is not performed. This is obviously a case where positions of data (X→Y) to be written do not overlap the course of moving for subsequent multiple Reads, and thus a benefit for the series of commands on the whole is not obtained.

When the append write command and the synchronization command are received, the following two operations are conceivable. First, a moving operation is not performed but new user data is written in the temporary storage area. In such a case, since moving for the writing processing is not performed, the movement distance can be reduced. However, the temporary storage area might run short during the writing.

Second, writing in the temporary storage area is not performed, but a rewriting operation and then writing at the originally intended position are performed. In such a case, the temporary storage area can be saved. However, there arises a need for moving to the rewriting start position X and then to perform rewriting.

The advantage and disadvantage of each of the two operations above have a correlation with the following two points. Specifically, which of these two operations is to be chosen is determined based on the volume (use ratio) of data stored in the temporary non-volatile storage area and a movement distance from the current position to the rewriting start position X. For example, assume the case of the aforementioned moving patterns 1-b, 2-a, and 2-b. When moving between two points for reading involves a large increase, it is chosen in principle that the rewriting operation is not performed on the tape. In addition, even if a rewriting operation between reading operations involves some increase in the movement distance, reduction in distance as a result of the writing in the temporary storage area might be larger than the increase. Also in this case, it is possible to make a choice of executing the rewriting operation during the moving for Read.

FIG. 7 shows the case 1-a where an EOD that is the rewriting position exists on the way in moving. The data stored in the buffer is not additionally written in the tape, but stored in the non-volatile storage area. In the case of moving A→B for Read, the way in moving includes an additional tape writing position (physical EOD) for an ordinary synchronization operation and a distance for writing (distance X-Y). Furthermore, the direction (X→Y) of writing data in the tape is the same as the moving direction for Read (A→B). As described above, in moving subsequent to a synchronization command, the append write position (physical EOD) and the tape writing length (data volume) are included in the movement distance. When the Read direction matches the writing direction, it is beneficial to perform, during the moving, the operation of rewriting the data stored in the non-volatile storage area.

Figure 8A:
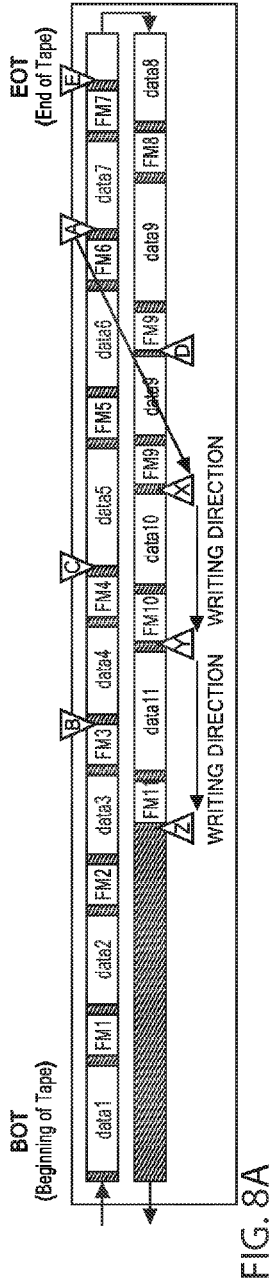
FIGS. 8A and 8B show modes in which data is written in the tape when there is no free space in a non-volatile storage area.
Figure 8B:
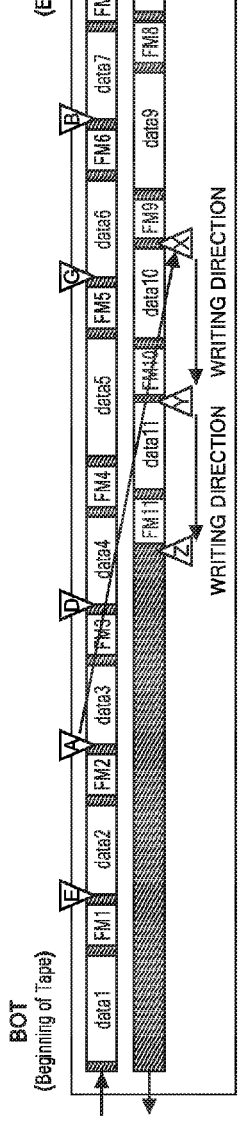

FIGS. 8A and 8B show modes in which data is written in the tape when the non-volatile storage area has no free space.

When the temporary storage area runs short during writing therein, the rewriting operation is unconditionally performed. Unless the rewriting operation is performed on the tape, a writing operation cannot be continued because there is no free space in the non-volatile storage area. After the rewriting operation, an ordinary tape writing operation may be performed continuously.

The followings show a difference in movement distance from the ordinary writing and synchronization operations.

There already exist data10 and FM10 in the temporary storage area.

When the temporary storage area runs short while receiving data11 newly, the movement distance is not changed if the moving direction from the current position A to the rewriting start position X matches the writing direction (FIG. 8A which is an upper figure, case 1-a). If the moving direction from the current position A to the rewriting start position X is opposite from the writing direction (FIG. 8B which is a lower figure, case 1-b), there is an increase by a distance of a reciprocation between the position Y and X.

The increase in movement distance is normally smaller than the reduction in distance as a result of writing in the temporary storage area, and thus the append write of the present invention can be performed.

When the Rewind command or the Unload command for the cartridge is received, the rewriting operation is performed unconditionally, because Rewind and Unload mean that the cartridge is used up. In this state, the moving target of the position B or E is the BOT of the tape. The position C or D (FIGS. 5A and 5B) are never the moving target, i.e., the BOT. The corresponding moving patterns are 1-a, 1-b, 4-a, and 4-b. In addition, the rewriting operation might cause a considerable increase in movement distance. For example, the moving patterns 4-a and 4-b correspond to this case. A rewriting operation is required to ensure data integrity and to use the cartridge in an ordinary manner when the cartridge is remounted. The increase in movement distance is offset by the reduction in distance by writing in the temporary storage area, except for a case where the moving pattern 4-a is repeated in a state where the current position A is located closer to the BOT than the rewriting start position X.

The example of the present invention is provided based on the linear recording system in which position movements for Read and Write are performed back and forth in the longitudinal direction of a tape medium. Append write in moving on the tape in the tape drive is applied to a case where data is sequentially read from or written in the tape. The embodiment of the present invention is applied to the case where a series of commands including mixed Read and Write from an upper-layer device (host) when one cartridge is loaded on the tape drive. In the example, the mixed Read and Write included in the series of commands issued by the host to the tape drive are executed. Hereinbelow, a description is given of a flowchart of operations for the append write command (Write), the read command (Read) and the moving command (Position) assumed before Read.

Figure 9:
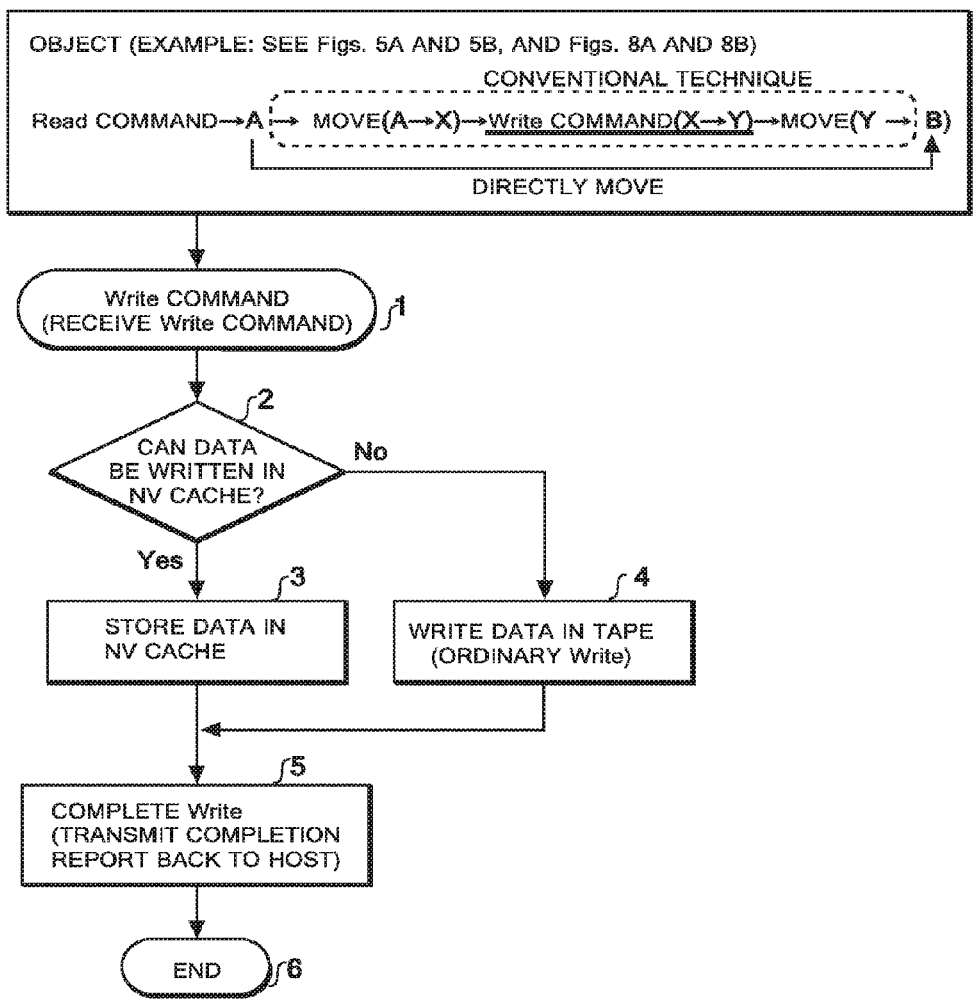
FIG. 9 shows an operation flow of additional data-writing (Write)

FIG. 9 shows an operation flow of data append write (Write) (steps 1-6).

The tape drive receives a Write command at the tape position A (FIGS. 5A and 5B) from the host. Data transmitted from the host and to be additionally written in the tape is stored in the buffer. The tape position (physical EOD) at which data is to be additionally written in the tape is the position X (FIGS. 5A and 5B). After the append write, the position Y (X→Y) becomes the EOD. A Position command causes the moving to the position X. The EOD after the append write is the position Y. Another moving command (Position command) causes the moving from the position Y to, for example, the position B. The embodiment of the present invention is provided on the assumption that the current position of the tape is at the position A after Read and direct moving to the target position B is performed for the next Read. Since the section X-Y is located in the same wrap in moving to the position B, data is stored in the non-volatile memory so that the append write in the tape can be performed (FIG. 11). The append write will be described later.

It is checked whether the data can be stored in an NV cache (non-volatile memory). If there is no free space in the NV cache, writing should be performed in the ordinary manner.

If there is a free space, the data is stored in the NV cache. If there is no free space, the data is written in the tape in the ordinary manner. In each of the above cases, a completion report of Write is transmitted back to the host.

Figure 10:
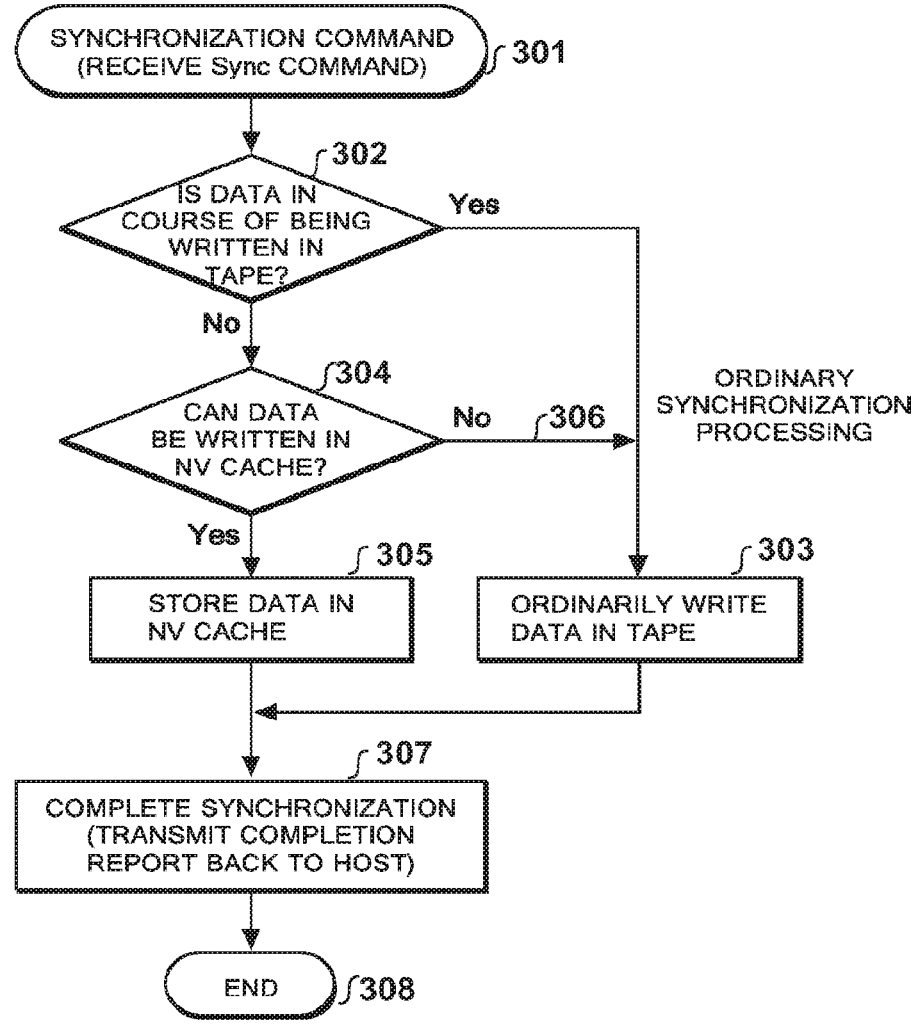
FIG. 10 shows an operation flow of synchronization (Sync)

FIG. 10 shows an operation flow of a synchronization command (Sync) (steps 301-308).

The tape drive receives a synchronization command (Sync) from the host. Instead, the Write command may involve a synchronization operation. Alternatively, the synchronization command may be a synchronization request implicitly specified by a position moving command in a state where data is left in the buffer as a result of a Write command. It is checked whether data is in the course of being written in the tape.

If data is in the course of being written, the ordinary append write is performed on the tape by using the ordinary synchronization processing. If data is not in the course of being written, it is checked whether data can be written in the NV cache. In other words, the check is made based on whether there is the following area.

If there is a free space in the NV cache, the data is stored in the NV cache, and then a synchronization completion report is transmitted back to the host (308). If there is no free space in the NV cache, the ordinary writing is performed (303) and then the synchronization completion report is transmitted back to the host (308).

FIG. 11 shows a moving operation flow in the case where there exists a writing position in moving between two positions (steps 401-414).

A moving command is received from the host. It is checked whether the command indicates moving to a logical EOD.

A logical EOD is a position at which the host completes data writing (a position notified by the tape drive to the host), while a physical EOD is a position at which the tape drive (internally) completes data writing. The logical EOD is an EOD for the host, while the physical EOD is an internal EOD of the drive and is a position at which the tape drive completes data writing. When data is written in the non-volatile memory, there are two physical EODs of "an EOD on the tape" and "an EOD in the non-volatile memory," and a logical EOD corresponds to the EOD in the non-volatile memory. In contrast, when data is not written in the non-volatile memory, there is only one physical EOD of "an EOD on the tape." The logical EOD in this case corresponds to the EOD on the tape. Here, since the operation is the internal operation in the tape drive, (even though the writing position corresponds to the logical EOD,) the description is given by using the physical EOD.

If the current position is the EOD (the EOD on the tape or the EOD in the NV cache), moving is not required. Subsequently, a moving completion report is transmitted back to the host (404), and thereafter the Write flow (6, FIG. 9) and then the synchronization command flow (307, FIG. 10) are executed. If the current position is not the logical EOD (402), it is checked whether data exists in the NV cache.

If data does not exist in the NV cache, a moving command (A→B) for Read transmitted from the host is executed. Then, a moving completion report is transmitted back to the host (413).

If data exists in the NV cache, it is determined whether writing is performed during moving. For example, when an EOD for data writing exists on the way in moving, the writing is determined to be executed. If the data should be written, the data in the NV cache is rewritten in the tape started from the EOD on the tape (412).

Ordinary moving is performed (409). If it is determined in step 410 that the data should not be written during the moving, just moving (A→B) is performed (409). Then, a moving completion report is transmitted back to the host (413).

The example above has been described concerning the tape drive, and the description has mainly given of the movement between Reads in the series of commands including mixed Write and Read. The scope of the invention is not limited to this example, and is provided on the assumption that completion of a synchronization operation is guaranteed in writing in a non-volatile storage area. The scope of the invention includes substantial tape writing of data stored in the non-volatile storage area if there is a chance of encountering a target tape position in a subsequent moving on the tape. Generally in a hierarchical storage management system, a lowest-layer tape library receives a series of commands including Read and Write. The tape drive with one cartridge loaded thereon is given many chances in which tape writing positions for the writing and synchronization commands overlap in moving for subsequent Read. As long as a new non-volatile storage area is provided in the tape drive or the cartridge, and a predetermined capacity thereof (for example, 100 Mbytes or more) is secured, it is possible to guarantee the performance of the operation of the series of commands on the whole by putting forward append write in the tape.

As described above, the embodiment of the invention exerts an advantageous effect that a replacement, by unloading and loading, of a cartridge exclusively used for writing or reading can be avoided in a library system such as a conventional one. The tape recording device, the method, and the program according to the present invention exert an advantageous effect that speed-up is achieved as a whole in operations including mixed Read and Write by omitting a moving operation involved with data writing.

The following is a list of reference numerals used in the figures described herein: tape drive (10); host I/F (11); buffer (12); channel (13); writing head (14a); reading head (14b); motor (15); controller (16); head position control system (17); motor driver (18); CMI/F (19); cartridge (20); library control mechanism (30); accessor (40); cartridge slot (50); tape library (100); host (200).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions (i.e., in the form of executable portions) for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A tape recording device for performing operations of position movement back and forth in a longitudinal direction and up and down in a latitudinal direction on a tape medium, reading, and writing to the tape medium, and receiving a series of read and write commands from an upper-layer device couplable to the tape recording device, the tape recording device comprising:
    a buffer for temporarily storing therein data related to a plurality of read commands and a plurality of write commands;
    a tape for recording thereon the data stored in the buffer;
    a reading and writing head for reading data from the tape into the buffer and writing the data from the buffer onto the tape;
    a controller for reading data from a designated position of the tape and storing the data in the buffer in response to each read command and for writing the data stored in the buffer onto the tape from a written data end position thereof in response to each write command; and
    a non-volatile memory for storing therein data stored in the buffer in response to each write command, wherein the controller, upon receipt of a plurality of write commands and a subsequent read/write command, performs the following:
        determines a current position of the head and a first position of the head for starting a subsequent read/write command,
        determines a second position for starting a first write command, a third position for finishing the first write command, and a first write direction for the first write command,
        determines a fourth position for starting a second write command, a fifth position for finishing the second write command, and a second write direction for the second write command,
        performs both the first write command and the second write command prior to the subsequent read/write command if the second position, the third position, fourth position, and fifth position are each located between the current position and the first position,
        performs both the first write command and the second write command prior to the subsequent read/write command if the second position, the third position, and fourth position, are each located between the current position and the first position and if the first write direction and the second write direction are in a same direction,
        performs the first write command prior to the subsequent read/write command if both the second position and the third position are located between the current position and the first position;
        determines a travel distance between the third position and the first starting position when the second position is located between the current position and the first starting position and the third position is not located between the current position and the first starting position;
        determines a ratio of the travel distance to an amount of available space when the second position is located between the current position and the first starting position and the third position is not located between the current position and the first starting position; and
        performs the first write command prior to the subsequent read/write command if the ratio is greater than a threshold amount.

2. The device of claim 1, wherein when receiving a command for rewinding or unloading a cartridge, the controller writes all the data stored in the non-volatile memory onto the tape from the written data end position if a predetermined criterion to minimize a movement distance by which the tape travels relative to the head is satisfied.

3. The device of claim 1, wherein when the non-volatile memory is filled up, the controller writes all the data stored in the non-volatile memory onto the tape from the written data end position if a predetermined criterion to minimize a movement distance by which the tape travels relative to the head is satisfied.

4. The device of claim 1, wherein after having returned a completion notification of the write command, the controller does not return the completion notification of the write command if a predetermined criterion to minimize a movement distance by which the tape travels relative to the head is satisfied.

5. The device of claim 1, wherein the controller executes the writing from the non-volatile memory onto the written data end position of the tape via the buffer.

6. The device of claim 1, wherein
    as a premise of the reading and writing commands, the controller receives a moving command from the higher-layer device so that the moving to a designated position of the tape is performed, and
    the head is positioned at a written data end position on the tape or a written end position in memory in response to the moving command.

7. The device of claim 1, wherein
    the write command includes a synchronization operation, and
    the controller writes the data stored in the buffer onto the tape or the non-volatile memory using the synchronization operation.

8. The device of claim 1, wherein the non-volatile memory is a flash memory having a predetermined capacity.

9. The device of claim 8, wherein the flash memory has a capacity of 100 megabytes or more.

10. The device of claim 1, wherein the non-volatile memory is a preparatory track area in the same tape of a cartridge.

11. A method for writing to a tape recording device, wherein the tape recording device receives a plurality of read commands and a plurality of write commands from an upper-layer device and comprises a buffer for temporarily storing data related to each read command and each write command, a tape for recording the data stored in the buffer, a reading and writing head for reading data from the tape into the buffer and for writing the data from the buffer onto the tape, and a controller for reading data from a designated position of the tape and storing the data in the buffer in response to each read command and for writing the data stored in the buffer onto the tape from each written data end position (EOD) in response to each write command, the method comprising:

receiving a plurality of write commands and a subsequent read/write command;

determining a current position of the head and a first position of the head for starting the subsequent read/write command;

determining a second position for starting a first write command, a third position for finishing the first write command, and a first write direction for the first write command;

determining a fourth position for starting a second write command, a fifth position for finishing the second write command, and a second write direction for the second write command;

performing both the first write command and the second write command prior to the subsequent read/write command if the second position, the third position, fourth position, and fifth position are each located between the current position and the first position;

performing both the first write command and the second write command prior to the subsequent read/write command if the second position, the third position, and fourth position, are each located between the current position and the first position and if the first write direction and the second write direction are in a same direction;

performing the first write command prior to the subsequent read/write command if both the second position and the third position are located between the current position and the first position;

determining a travel distance between the third position and the first starting position when the second position is located between the current position and the first starting position and the third position is not located between the current position and the first starting position;

determining a ratio of the travel distance to an amount of available space when the second position is located between the current position and the first starting position and the third position is not located between the current position and the first starting position; and performing the first write command prior to the subsequent read/write command if the ratio is greater than a threshold amount.

12. The method of claim 11, further comprising:
receiving a command for rewinding or unloading a cartridge; and
writing all the data stored in the non-volatile memory onto the tape from the written data end position if a predetermined criterion to minimize a movement distance by which the tape travels relative to the head is satisfied.

13. The method of claim 11, further comprising
determining that the non-volatile memory is full; and
writing all the data stored in the non-volatile memory onto the tape from the written data end position if a predetermined criterion to minimize a movement distance by which the tape travels relative to the head is satisfied.

14. The method of claim 11, wherein as a premise of the reading and writing commands, the method further comprising:
receiving a moving command from the higher-layer device so that the moving to a designated position of the tape is performed; and positioning the head at a written data end position on the tape or a written end position in memory in response to the moving command.

15. The method of claim 11, wherein the write command includes a synchronization operation, the method further comprising writing the data stored in the buffer onto the tape or the non-volatile memory using the synchronization operation.

16. A computer program product for writing to a tape recording device, wherein the tape recording device receives a plurality of read commands and a plurality of write commands from an upper-layer device and comprises a buffer for temporarily storing data related to each read command and each write command, a tape for recording the data stored in the buffer, a reading and writing head for reading data from the tape into the buffer and for writing the data from the buffer onto the tape, and a controller for reading data from a designated position of the tape and storing the data in the buffer in response to each read command and for writing the data stored in the buffer onto the tape from a written data end position (EOD) in response to each write command, the computer program product comprising a non-transitory computer-readable storage medium including computer-readable program code portions stored therein, the computer-readable program code portions comprising:

computer code for receiving a plurality of write commands and a subsequent read/write command;

computer code for determining a current position of the head and a first position of the head for starting the subsequent read/write command;

computer code for determining a second position for starting a first write command, a third position for finishing the first write command, and a first write direction for the first write command;

computer code for determining a fourth position for starting a second write command, a fifth position for finishing the second write command, and a second write direction for the second write command;

computer code for performing both the first write command and the second write command prior to the subsequent read/write command if the second position, the third position, fourth position, and fifth position are each located between the current position and the first position;

computer code for performing both the first write command and the second write command prior to the subsequent read/write command if the second position, the third position, and fourth position, are each located between the current position and the first position and if the first write direction and the second write direction are in a same direction;

computer code for performing the first write command prior to the subsequent read/write command if both the second position and the third position are located between the current position and the first position;

computer code for determining a travel distance between the third position and the first starting position when the second position is located between the current position and the first starting position and the third position is not located between the current position and the first starting position;

computer code for determining a ratio of the travel distance to an amount of available space when the second position is located between the current position and the first starting position and the third position is not located between the current position and the first starting position; and computer code for performing the first write command prior to the subsequent read/write command if the ratio is greater than a threshold amount.

17. The computer program product of claim 16, further comprising:

computer code for receiving a command for rewinding or unloading a cartridge; and computer code for writing all the data stored in the non-volatile memory onto the tape from the written data end position if a predetermined criterion to minimize a movement distance by which the tape travels relative to the head is satisfied.

18. The computer program product of claim 16, further comprising computer code for determining that the non-volatile memory is full; and computer code for writing all the data stored in the non-volatile memory onto the tape from the written data end position if a predetermined criterion to minimize a movement distance by which the tape travels relative to the head is satisfied.

19. The computer program product of claim 16, wherein as a premise of the reading and writing commands, the computer program product further comprising:

computer code for receiving a moving command from the higher-layer device so that the moving to a designated position of the tape is performed; and computer code for positioning the head at a written data end position on the tape or a written end position in memory in response to the moving command.

20. The computer program product of claim 16, wherein the write command includes a synchronization operation, the computer program product further comprising computer code for writing the data stored in the buffer onto the tape or the non-volatile memory using the synchronization operation.

* * * * *